United States Patent
Schmitt

[19]

[11] Patent Number: 6,038,892
[45] Date of Patent: Mar. 21, 2000

[54] COMBINATION KEYLOCK DEVICE AND SECURING DEVICE

[75] Inventor: Ty. R. Schmitt, Round Rock, Tex.

[73] Assignee: Dell USA, L.P., Round Rock, Tex.

[21] Appl. No.: 09/013,767

[22] Filed: Jan. 27, 1998

[51] Int. Cl.[7] .................................................. E05B 65/44
[52] U.S. Cl. ..................... 70/78; 70/81; 70/84; 70/380; 70/386; 292/152; 292/303
[58] Field of Search .................... 70/78–81, 83, 70/84, 380, 386; 292/152, 303, 252

[56] References Cited

U.S. PATENT DOCUMENTS

| | | | |
|---|---|---|---|
| 161,023 | 3/1875 | Gale et al. | 292/152 |
| 1,233,733 | 7/1917 | Voight | 70/380 |
| 1,243,016 | 10/1917 | Voight | 70/380 |
| 1,343,438 | 6/1920 | Deibert | 70/380 |
| 1,937,425 | 11/1933 | Falk | 70/107 |
| 1,937,942 | 12/1933 | Briggs | 70/107 |
| 3,008,785 | 11/1961 | Gehrs | 70/81 |
| 3,039,802 | 6/1962 | Barry | 292/86 X |
| 3,697,107 | 10/1972 | Krantz | 70/451 X |
| 4,470,276 | 9/1984 | Bayless | 70/380 X |
| 4,563,885 | 1/1986 | Madden | 70/380 X |
| 4,729,614 | 3/1988 | Nadler et al. | 312/292 |
| 5,050,926 | 9/1991 | Tanaka | 292/303 X |
| 5,231,935 | 8/1993 | Oder et al. | 109/59 |
| 5,249,443 | 10/1993 | Anderson | 70/83 X |
| 5,379,184 | 1/1995 | Barraza et al. | 312/332.1 X |
| 5,467,619 | 11/1995 | Stillwagon et al. | 70/386 X |
| 5,598,323 | 1/1997 | Muller | 361/726 |
| 5,684,671 | 11/1997 | Hobbs et al. | 312/223.2 X |

FOREIGN PATENT DOCUMENTS

| | | | |
|---|---|---|---|
| 195388 | 1/1924 | United Kingdom | 292/152 |
| 533320 | 2/1941 | United Kingdom | 292/254 |

*Primary Examiner*—Lloyd A. Gall
*Attorney, Agent, or Firm*—Skjerven, Morrill, MacPherson, Franklin & Friel, L.L.P.; David G. Dolezal

[57] ABSTRACT

A keylock assembly including both a keylock device for locking a door to a chassis frame and a securing device for securing the door to the chassis frame so that the door can be secured to the chassis frame without having to lock the door. The chassis may house a computer system that includes a processor and a peripheral device. The keylock device includes a latch member and a keylock wherein the securing device includes a threaded portion screwed into the keylock to attach the latch member to the keylock. One example of a securing device attached to the keylock device is a ball stud. To secure the door to the chassis frame, the ball stud engages a corresponding structure, such as a two pronged clip, when the door is in a closed position with respect to the chassis frame. The door may be removably and pivotally attached to the housing frame via a hinge.

30 Claims, 8 Drawing Sheets

COMBINATION KEYLOCK DEVICE AND SECURING DEVICE

CROSS-REFERENCE TO RELATED APPLICATIONS

This application relates to co-pending U.S. patent application Ser. No. 09/013,956 attorney docket number M-5621, filed herewith, entitled "Peripheral Device Carrier" and naming Ty R. Schmitt as inventor, the application being incorporated herein by reference in its entirety.

This application relates to co-pending U.S. patent application Ser. No. 09/014,354 attorney docket number M-5336, filed herewith, entitled "Peripheral Device Mounting Apparatus" and naming Ty R. Schmitt as inventor, the application being incorporated herein by reference in its entirety.

BACKGROUND OF THE INVENTION

1. Field of the Invention

This invention relates to computer systems in general and more particularly to a combination keylock device and securing device for a computer system housing.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) compatible PC systems, include desk top, floor standing, or portable versions. A typical PC system includes a processor, associated memory such as a RAM, control logic, and a number of peripheral devices that provide input and output for the system. Such peripheral devices often include floppy and hard disk drives, CD-ROM drives, network capability cards, terminal devices, modems, sound devices, voice recognition devices, electronic pen devices, and other mass storage devices such as tape drives and DVDs.

A housing for a computer system may include a door which when opened, allows access to the components in the interior of the housing. In some computer system housings, it is desirable that the door be locked in a closed position in order to inhibit access to the interior of the computer system housing so as to prevent the unauthorized removal of computer system components located in the computer system housing. A keylock device is one mechanism used to lock a door to a frame structure of a computer system housing wherein access to the interior can be limited to only those individuals with access to a compatible key.

With a computer system housing having a keylock for locking the door to the housing frame structure, it is often desirable to have a securing device or devices to secure the door to the frame structure in a closed position without having to lock the door with the key. For those operations that require frequent opening and closing of the door, it is desirable to secure the door to the computer system housing in a closed position without having the extra steps of unlocking and locking the door with each entry.

Typically, securing devices such as ball studs, snaps, clips, hooks, or latches attached to the door and/or housing frame structure allow a door to be secured to the housing frame simply by the motion of moving the door to a closed or secured position with respect to the frame and, in some structures, also allow for the unsecuring of the door by moving the door away from the closed or secured position. When the door is secured to the housing frame structure in a closed or secured position, the door is not allowed to swing freely away from the closed position.

Typically, the locking device and the securing devices of a computer system housing are implemented by separate structures. However, because of limited space requirements of a computer system housing, what is needed is a structure to perform both functions.

SUMMARY OF THE INVENTION

It has been discovered that providing a keylock assembly that includes both a keylock device and a securing device advantageously provides a structure that is able to both lock and secure a door to a housing frame.

In one aspect of the invention, a keylock assembly that is attachable to a door for locking a door to a housing frame includes a keylock device. The keylock device includes a keylock and a latch member movable by the keylock to a locked position where a portion of the housing frame retains the latch member to lock the door to the housing frame. The keylock assembly also includes a securing device attached to the keylock device. When the door is in a closed position, the securing device engages a corresponding structure of the housing frame to secure the door to the housing frame.

In another aspect of the invention, a housing includes a frame structure, a door, and a keylock assembly attached to the door. The keylock assembly includes a keylock device including a keylock and a latch member movable by the keylock to a locked position where the frame structure retains the latch member to lock the door to the frame structure. The keylock assembly also includes a securing device attached to the keylock device. When the door is in a closed position, the securing device engages a corresponding structure of the frame structure to secure the door to the frame structure.

In another aspect of the invention, a computer system includes a processor, a peripheral device operably coupled to the processor, and a computer system housing. The computer system housing includes a frame structure, a door, and a keylock assembly attached to the door. The keylock assembly includes a keylock device including a keylock and a latch member movable by the keylock to a locked position where a portion of the frame structure retains the latch member to lock the door to the frame structure. The keylock assembly also includes a securing device. When the door is in a closed position, the securing device engages a corresponding structure of the frame structure to secure the door to the frame structure. The computer system housing houses the peripheral device.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of the best contemplated mode for carrying out the invention. The description is intended to be illustrative of the invention and should not be taken to be limiting.

Figure 1:
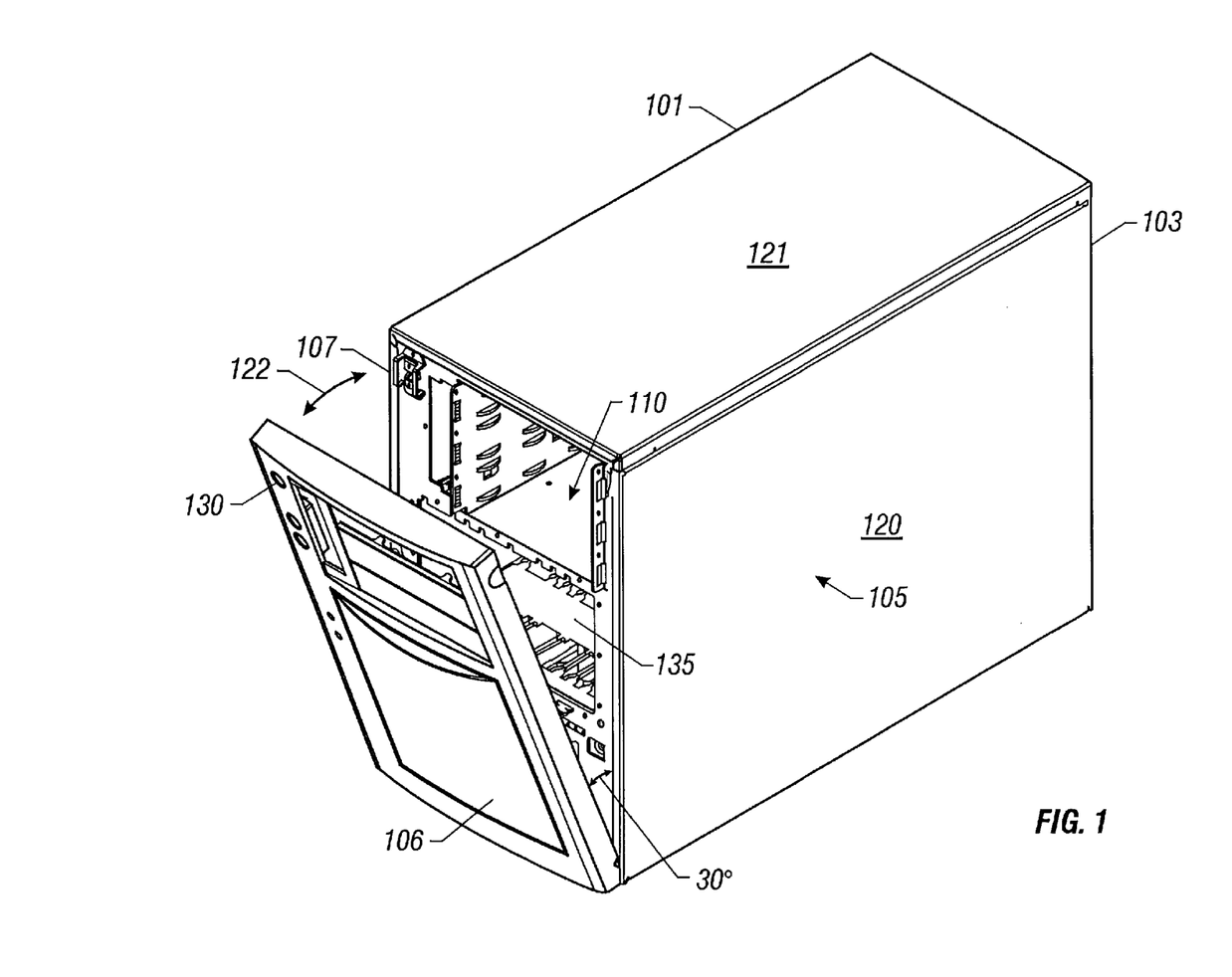
FIG. 1 is a perspective view of a computer system according to the present invention.

FIG. 1 shows perspective view of a computer system according to the present invention. Computer system 101 is an IBM compatible personal computer system that includes a system processor (not shown) conforming to the X86 architecture, a RAM, and other peripheral devices such as a power supply and keyboard controller (both not shown) housed within the computer system housing or chassis 103. Computer system 101 includes electrical connectors located on the backside of housing 103 (not shown) for coupling the computer system 101 to a monitor and keyboard (both not shown). The computer system housing 103 includes a housing frame structure 105 and a door 106 located on the front side of the housing 103 attached to the frame structure 105 via corresponding hinges (not shown in FIG. 1) located at the bottom of the door 106 and housing frame 105. The door is movable with respect to the housing frame structure 105 on the corresponding hinges as shown by arrow 122. Other housing frame 105 items shown in FIG. 1 include a side panel 120, a top panel 121, and a front panel 125.

Door 106 includes a keylock assembly 130 having a keyhole accessible from the front of the housing 103 for locking the door 106 to the housing frame 105 when the door is in a locked or closed position with respect to the frame 105, which in FIG. 1 is where the outer edges of the door 106 fit up against the outer edges of the front side of the housing frame 105. In FIG. 1, door 106 is shown in an approximately 30 degree open position with respect to the housing frame 105. In FIG. 1, door 106 is shown in an unsecured or unlocked position wherein a user is allowed access to some of the devices and components housed in the housing 103 via the front side of the housing. Keylock assembly 130 also includes a securing device (not shown in FIG. 1) that, when the door is in a closed position, engages a corresponding structure 107 of the housing frame 105 to secure the door 106 to the housing frame 105.

Computer system housing 103 includes a chassis or carrier bay 110 for removably housing peripheral devices mounted to carriers such as hard disk drives, CD ROM drives, or tape back up devices. Located in the back of the carrier bay 110 are electrical connectors (not shown) for operably coupling the peripheral device to the system processor. Door 106 controls the removability of a peripheral device located in the carrier bay 110 via the front side of the computer system housing 103. When the door is in an open position, a peripheral device inserted in the carrier bay 110 may be removed from the carrier bay 110 via the front side. Also, when the door 106 is in an open position, a peripheral device may be inserted into an unoccupied carrier bay 110. When the door 106 is in a closed position with respect to the housing frame 105, the peripheral device located in carrier bay 110 cannot be removed from carrier bay 110 from the front side of the housing 103. Consequently, locking the door with the keylock 130 assembly when the door is in a closed or locked position, inhibits the removability of the peripheral device via the front side of the computer system housing 103. Computer system housing 103 also includes carrier bay 135 for removably housing peripheral devices. See, for example, U.S. patent application Ser. No. 09/013, 956 attorney docket number M-5621, filed herewith, entitled "Peripheral Device Carrier" and naming Ty R. Schmitt as inventor, the application being incorporated herein by reference in its entirety.

In other embodiments, computer system 101 may be another type of computer system such as a network server or may conform to other types of computer system architectures. In other embodiments, the computer system housing frame and door may have other forms, shapes, and/or configurations including the door being attached to the housing frame via side hinges or by other mechanisms.

Figure 2:
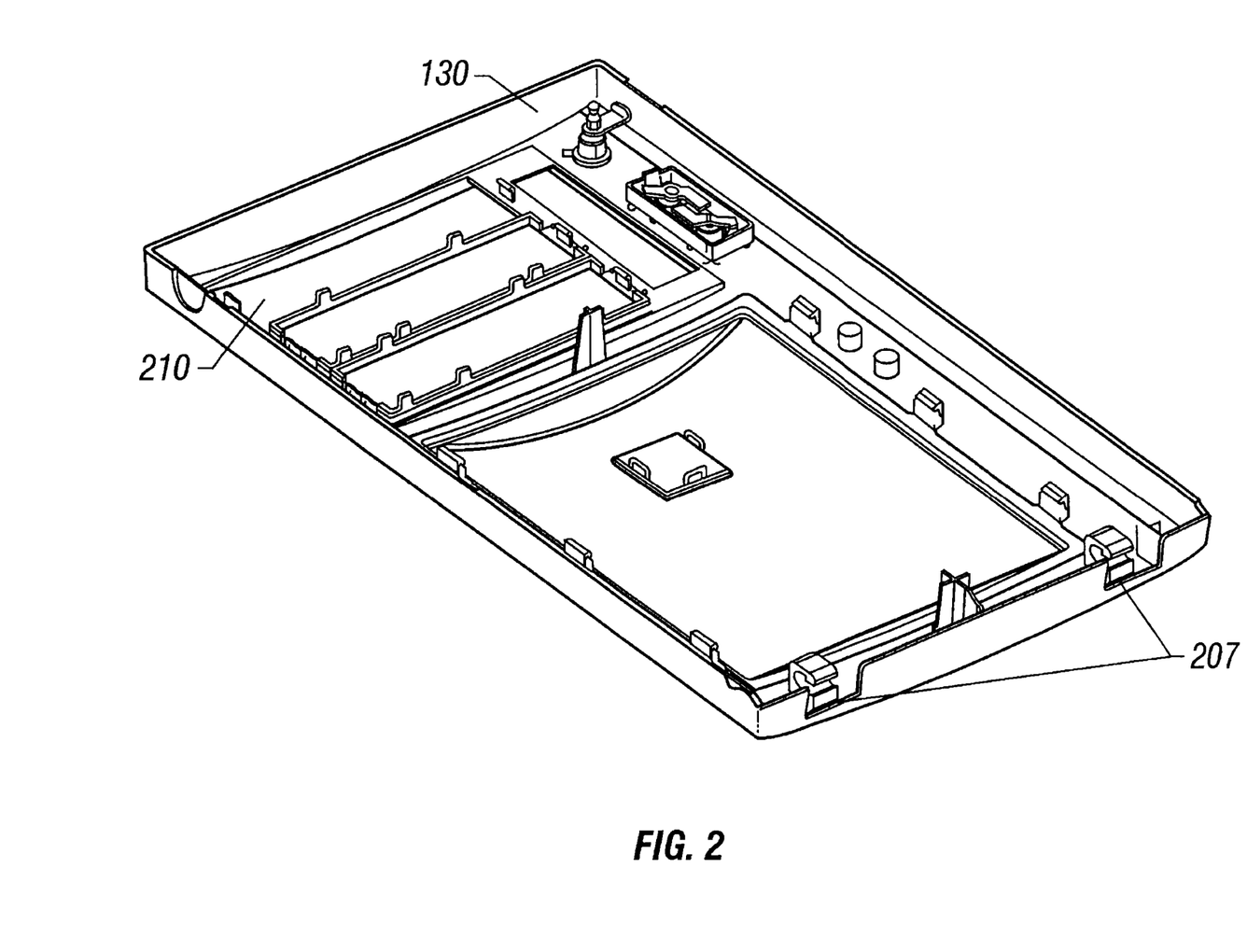
FIG. 2 is a perspective view of a door for a computer system housing with an attached keylock assembly according to the present invention.

FIG. 2 shows is a perspective view of one embodiment of a computer system housing door according to the present invention. Door 106 includes an opening 210 to enable the door 106 to incorporate bezel-like features wherein a portion of a peripheral device located in the carrier bay 110 is exposed via opening 210 when the door is in a closed position with respect to the housing frame 105. Even though a portion of the peripheral device may extend through door 106 via opening 210 when door 106 is in the closed position, the peripheral device is retained in the carrier bay 110 by the portion of the door 106 surrounding opening 210. Door 106 also includes a keylock assembly 130 for locking and/or securing the door to the housing frame when the door is in a closed or locked position with respect to the housing frame.

Door 106 includes door portions 207 of the hinges which are removably engagable to corresponding portions of the hinges (see, for example, FIG. 11) of the housing frame 105 to pivotally attach door 106 to the housing frame 105. In the embodiment shown, the outer frame portion of door 106 is made of a plastic material wherein the door portions of the hinges 207 are integrally formed with the outer frame portion of the door 106.

Figure 3:
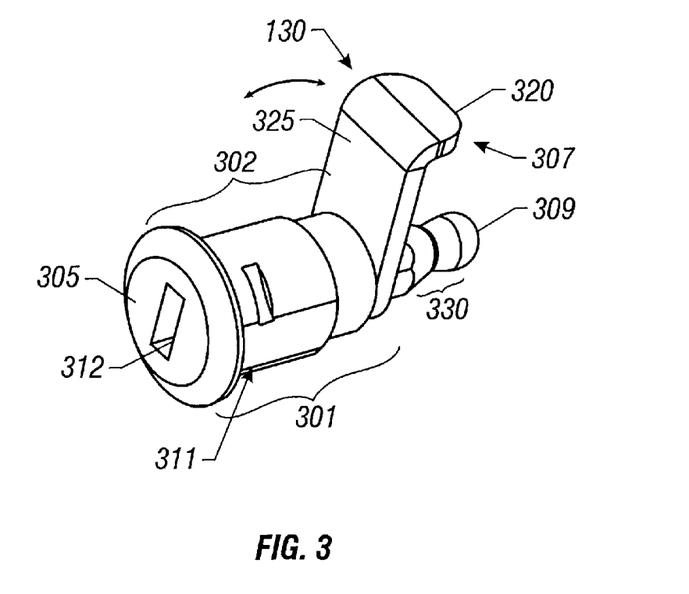
FIG. 3 is a perspective view of a keylock assembly according to the present invention.

FIG. 3 shows a perspective view of one embodiment of a keylock assembly according to the present invention. Keylock assembly 130 includes a keylock device 301 and securing device 309. Keylock device 301 includes a keylock 302 and a latch member or cam 307. Keylock 302 is a cylindrical keylock that includes an inner barrel 305 and an outer structure 311. Inner barrel 305 is movable with respect to the outer structure 311. Inner barrel 305 includes a keyhole 312 located at one end for receiving a key (not shown). When a compatible key is fully inserted into keyhole 312, a user can, with the key, rotate the inner barrel 305 with respect to the outer structure 311. The keylock assembly 130 is attached to the door 106 via the outer structure 311 allowing the inner barrel 305 to be rotated with respect to the door.

Latch member or cam 307 is attached to a second end of the inner barrel 305. In FIG. 3, the latch member has a bent portion 320. However, in other embodiments, the latch member 307 does not include a bent portion. The latch member 307 is fixed to the inner barrel 305 such that when the key rotates the inner barrel 305, latch member 307 rotates in the same direction and with the same angular speed as the inner barrel 305. When the door 106 is swung closed to a closed position with respect to the housing frame 105, the door may be locked to the housing frame by rotating inner barrel 305 with a compatible key inserted into keyhole 312 to move or rotate the latch member 307 to a locked position where a portion of the housing frame 105 retains the latch member 307. When the door 106 is in a closed position and the latch member 307 is in a locked position, surface 325 of latch member 307 faces the portion of the housing frame retaining the latch member. The door is unlocked by rotating inner barrel 305 with the compatible key to move or rotate latch member 307 to an unlocked position so that the portion of the housing frame no longer retains latch member 307.

Keylock assembly 130 also includes a securing device 309 attached to the inner barrel 305 for engaging a corresponding structure of the housing frame to secure the door to the housing frame when the door is in a closed or secured position with respect to the housing frame. In FIG. 3, the securing device 309 is a threaded ball stud having a detent 330. A portion of the corresponding structure of the housing frame resides in detent 330 when ball stud 309 engages the corresponding structure of the housing frame. Detent 330 has inwardly sloping or tapered sides allowing for a "smooth" engagement and disengagement of the securing device to and from a corresponding structure of the housing frame.

Figure 4:
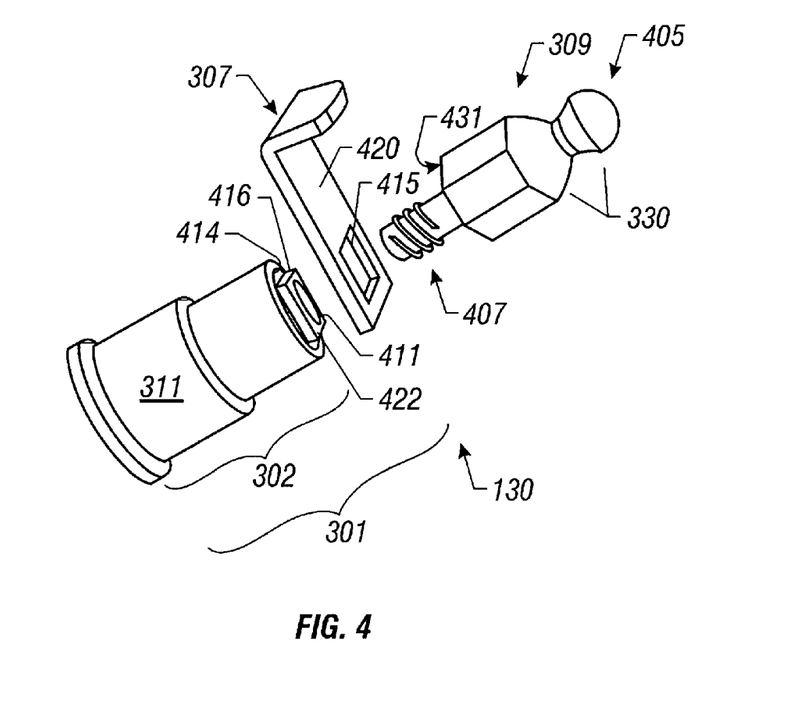
FIG. 4 is a perspective view of a partially disassembled keylock assembly according to the present invention.

FIG. 4 shows a perspective view of one embodiment of a partially disassembled keylock assembly according to the present invention. As shown in FIG. 4, ball stud 309 includes a threaded portion 407 which is screwed into a threaded hole 411 located at an end 414 of inner barrel 305 to attach the ball stud 309 to the inner barrel 305 of keylock 302.

Latch member 307 includes a latch hole 415 having a square shape. To attach latch member 307 to the inner barrel 305, latch member 307 is placed against end 414 of inner barrel 305 where a corresponding square structure 416 attached or connected to inner barrel 305 extends through latch hole 415 such that side 422 of square structure 416 is flush with or slightly recessed from side 420. The threaded portion 407 of ball stud 309 is inserted into the threaded hole 411 and screwed into the threaded hole 411 until surface 431 (not shown) of ball stud 309 resides against the flush surfaces 422 and 420. In this attached position, surface 431 retains latch member 307 against the end surface 414 to fixably attach latch member 307 to the inner barrel 305 such that a rotation of the inner barrel by a compatible key also rotates latch member 307. In this attached position, a portion of the ball stud 309 extends through the latch hole 415. In other embodiments, the securing device is attached to the keylock device 301 by other attaching mechanisms or techniques such as by welding or by rivets. In other embodiments, the keylock device includes a rotational stopping mechanism that physically limits the rotational range of the inner barrel 305 (and latch member 307) with respect to the outer structure 311. In one embodiment, the rotational range is physically limited to approximately 90 degrees.

Attaching the latch member to the keylock with a securing device provides for a simple and compact device that both locks and secures a door to a housing frame structure.

Figure 5:
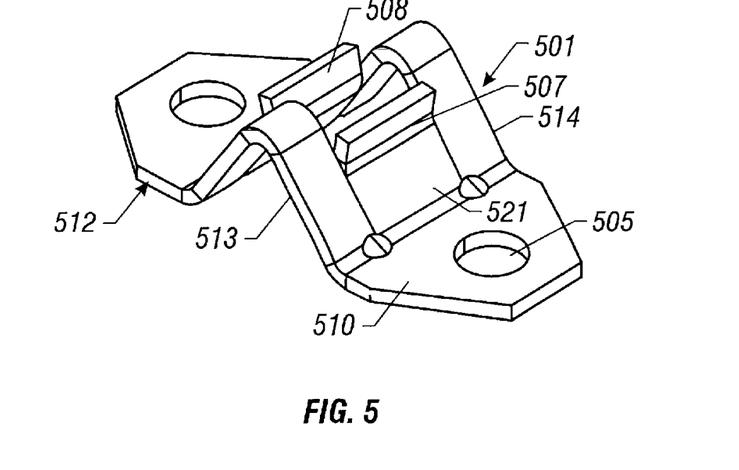
FIG. 5 is a perspective view of a structure for engaging a securing device according to the present invention.

FIG. 5 shows a perspective view of one embodiment of a structure for engaging a securing device to secure a door attached to the keylock assembly to a computer system housing frame. Structure 501 is a clip offered under the trade designation "TINNERMAN" by EATON. Clip 501 includes base members 510 and 512 each including a hole 505 for attaching the clip to a mounting bracket connected to the front panel 125 of the housing frame (See FIG. 6 and See item 107 of FIG. 1). The base members 510 and 512 are connected via arch members 513 and 514. The bottom side of clip 501, relative to the view shown in FIG. 5, faces the door when the clip is attached to the computer housing frame.

Clip 501 includes two retaining prongs 507 and 508 connected to base members 510 and 512, respectively. Prongs 507 and 508 are resiliently movable with respect to the base members 510 and 512, respectively, such that when clip 501 is attached to housing frame 105, prongs 507 and 508 are resiliently movable with respect to the housing frame 105. Prong 507 includes an angled portion 521 which is angled to ease the alignment of a ball stud when the ball stud is being inserted between the prongs from the bottom side of clip 501, relative to the view shown in FIG. 5, to secure the door to the housing frame. Prong 508 also includes an angled portion (item 624 on FIG. 6). Also, the angled portion of prongs 507 and 508 (items 521 and 624) transfer a retaining force upward, relative to the view shown in FIG. 5, against the ball 405 of ball stud 309 from a mounting bracket attached to base members 510 and 512, wherein the retaining force resists the movement of the ball stud 309 away from clip 501, (or downward relative to the view shown in FIG. 5) when the door is in the secured or closed position. (See FIG. 6).

Figure 6:
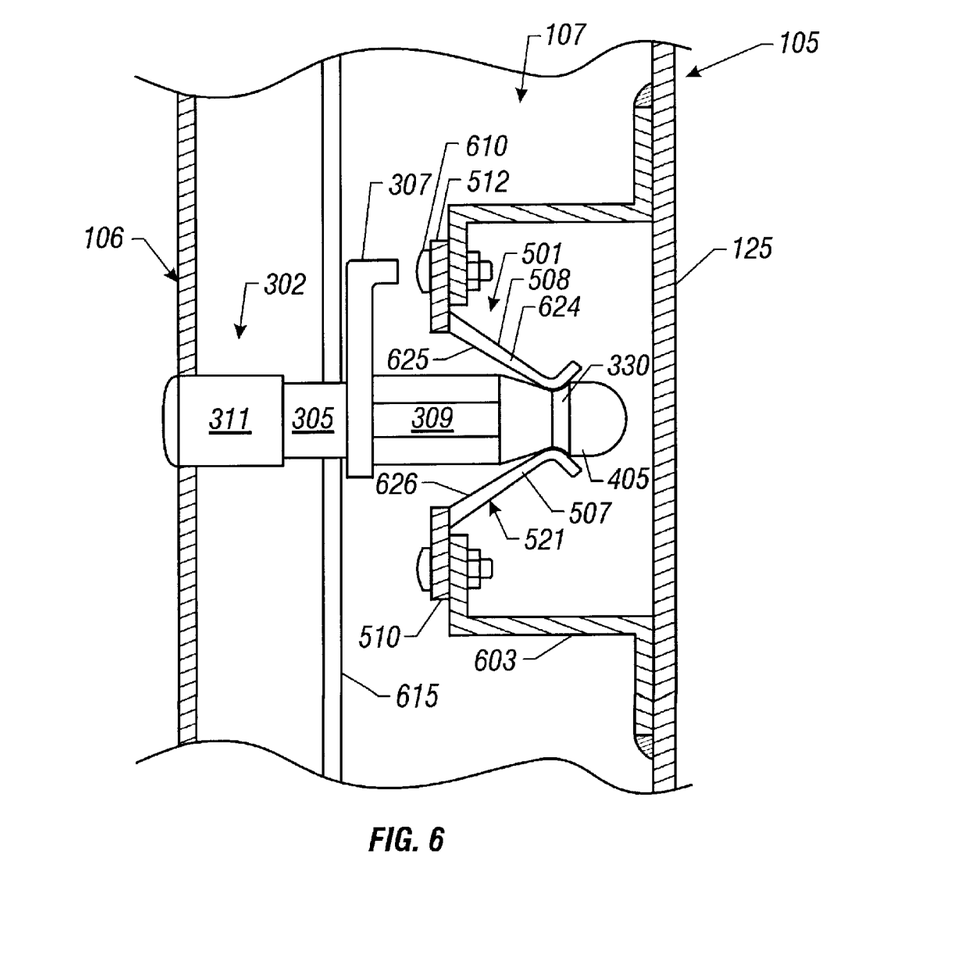
FIG. 6 is a partial cutaway side view of a securing device of a keylock assembly engaging a structure of a housing frame to secure a door to the housing frame according to the present invention.

FIG. 6 shows a partial cutaway side view of one embodiment of a door in a closed position and secured to a computer system housing frame. In FIG. 6, ball stud 309 is shown engaging clip 501 to secure door 106 to the frame 105 of the computer system housing 103. Clip 501 is attached to mounting bracket 603 with screws 610. Mounting bracket 603 is attached to the front frame wall 125 by spot welding. However, the attachments may be made by other attaching mechanisms or techniques. In FIG. 6, retaining prongs 507 and 508 are resiliently biased to provide an inward force upon ball stud 309 at detent 330. In the secured position, prongs 507 and 508 reside in detent 330. This inward force on the ball stud 309 at detent 330 ensures that the prongs 507 and 508 are forced or pressed against the ball stud 309 at detent 330 so that the angle portions 521 and 624 transfer an inward retaining force, or force to the right relative to the view shown in FIG. 6, from the mounting bracket 603 against ball 405 of ball stud 309 to secure door 106 to the housing frame 105 via the keylock assembly 130. In FIG. 6, door 106 is shown in a closed or secured position with respect to the housing frame 105.

Housing frame 105 also includes a ledge 615 which is a portion of the housing frame that retains the latch member 307 when the latch member is moved to a locked position with respect to the keylock assembly 130. In FIG. 6, the latch member 307 is in an unlocked position in that latch member 307 is not retained by ledge 615. To lock door 106 to the housing frame 105, a user would insert a compatible key into the keyhole of keylock 302 and turn latch member 307 a quarter turn counter clockwise, as viewed from the front side of door 106 or from the left side relative to the view shown in FIG. 6, to a locked position where latch member 307 is retained by ledge 615.

Because the ball stud 309 is attached to the inner barrel 305, rotating the inner barrel 305 and latch member 307 to lock the door 106 to the housing frame 105 also rotates the ball stud 309 in the same direction as the inner barrel 305. Referring back FIG. 3, because detent 330 angularly encircles the end portion of the ball stud 309, prongs 507 and 508 continuously contact or reside in detent 330 during the rotation of the ball stud 309. Thus, the ball stud 309 continuously engages the engaging structure during the rotation of the latch member during the locking of the door. However, in other embodiments, the securing device does not engage a structure of the housing frame when the door is locked to the housing frame. Also, in other embodiments, the securing device is attached to the outer structure 311 of keylock 302 such that the securing device 309 is not rotated when the latch member 307 is being rotated to a locked position.

To remove or unsecure the door 106 from the frame structure when the door is unlocked, a user provides a force on the door 106 to move the door to the left, relative to the view shown in FIG. 6. This removing force on the door 106 provides a force to the left, relative to the view shown in FIG. 6, on ball stud 309. Because the prongs 507 and 508 reside in and apply a force to detent 330 of the ball stud 309, moving the ball stud 309 to the left, relative to the view shown in FIG. 6, moves the portion of the prongs contacting the detent 330 outward to enable the ball portion 405 to pass between the prongs 507 and 508 to release the ball stud from clip 501 and to correspondingly "unsecure" the door 106 from the housing frame 105.

To secure the door 106 to the housing frame 105 from a position where door 106 is in an open and unsecured position with respect to the housing frame, the door is swung on the hinges towards a closed or secured position with respect to the housing frame 105. As the door approaches the secured position, ball 405 contacts the inner sides 625 and 626 of the angled portions 624 and 521 of prongs 508 and 507, respectively. The further insertion of the ball stud towards the secured position (as shown in FIG. 6) forces the prongs 507 and 508 outward until the ball portion 405 clears the opening between prongs 507 and 508 wherein the prongs move back towards each other as the portion of the prongs 507 and 508 contacting the ball stud 309 contact the sloped side of the detent 330. The door is further moved towards the housing frame until it resides in its position with respect to the housing frame as shown in FIG. 6.

In other embodiments, the keylock assembly may include other securing devices such as latches, snaps, hooks, or clips, or structures similar to a ball stud. In other embodiments, the securing device may be attached to other portions of the keylock device including the outer structure and/or latch member. Also in other embodiments, the corresponding structure may have a different configuration. For example, the base portions 510 and 512 of clip 501 may be attached to the frame wall 125 wherein prongs 507 and 508 extend through an aperture in the frame wall 125. In other embodiments, prongs 507 and 508 may be integrally connected to the frame wall 125. In other embodiments, other types of receiving structures may be used which correspond to the type of securing device used in the keylock assembly.

Figure 7:
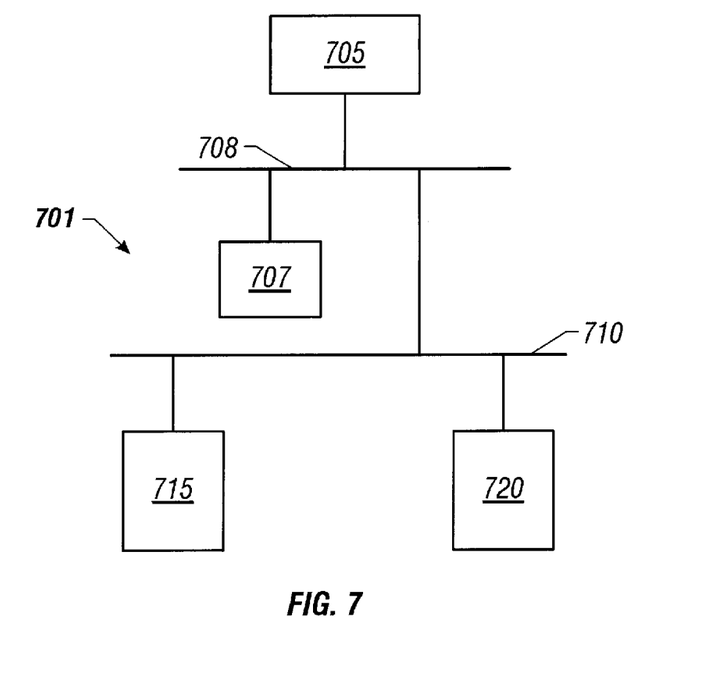
FIG. 7 is a diagram of a computer system according to the present invention.

FIG. 7 shows a diagram of a computer system according to the present invention. Computer system 701 includes a system processor 705 operably coupled to a RAM 707 via a local computer system bus 708. A keyboard controller 720 and a hard disk drive 715 which includes a memory controller are also operably coupled to the processor 705 via a computer system bus 710. All of the components shown in FIG. 7 are located within a computer system housing. In computer system 701, the hard disk drive 715 and associated memory controller are located in a chassis or carrier that is insertable into chassis bay 110 to be operably coupled to the processor via computer system bus 710. In other embodiments, other peripheral devices such as a CD ROM drive, floppy disk drive, or tape back up device may also be located in carrier bay 110. In other embodiments, the computer system components may be located in separate computer system housings, each of which may incorporate a keylock assembly similar to keylock assembly 130.

Figure 8:
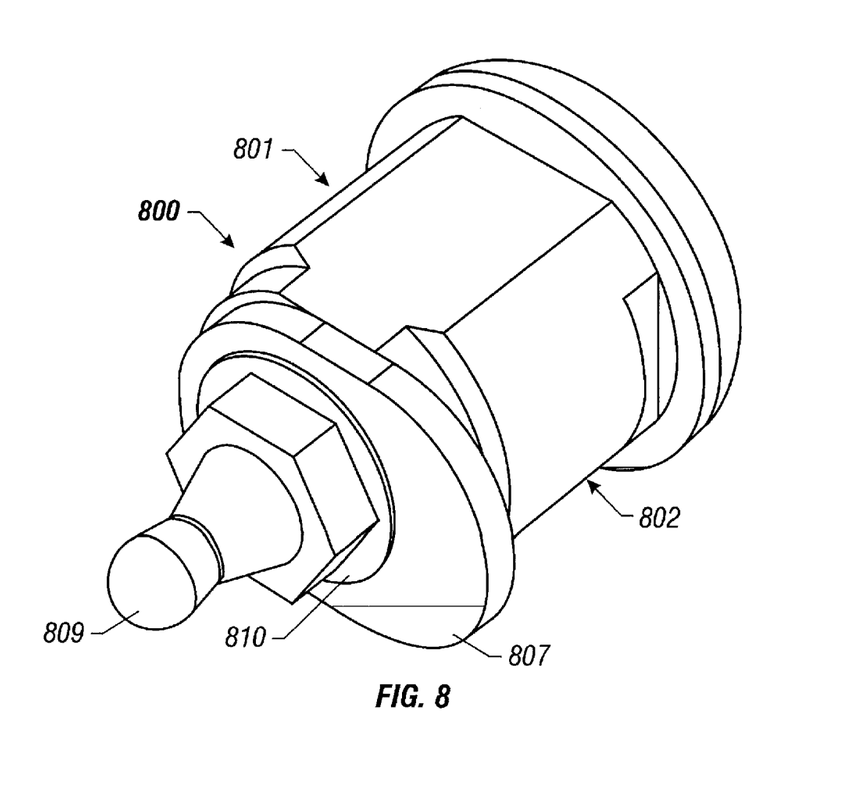
FIG. 8 is a perspective view of a keylock assembly according to the present invention.

FIG. 8 shows a perspective view of one embodiment of a keylock assembly according to the present invention. Keylock assembly 800 includes a keylock device 801 and securing device 809, which in the embodiment shown, is a ball stud. Keylock device 801 includes a keylock 802 and a latch member or cam 807. Keylock assembly 800 also includes a washer 810 such as a locking washer.

Figure 9:
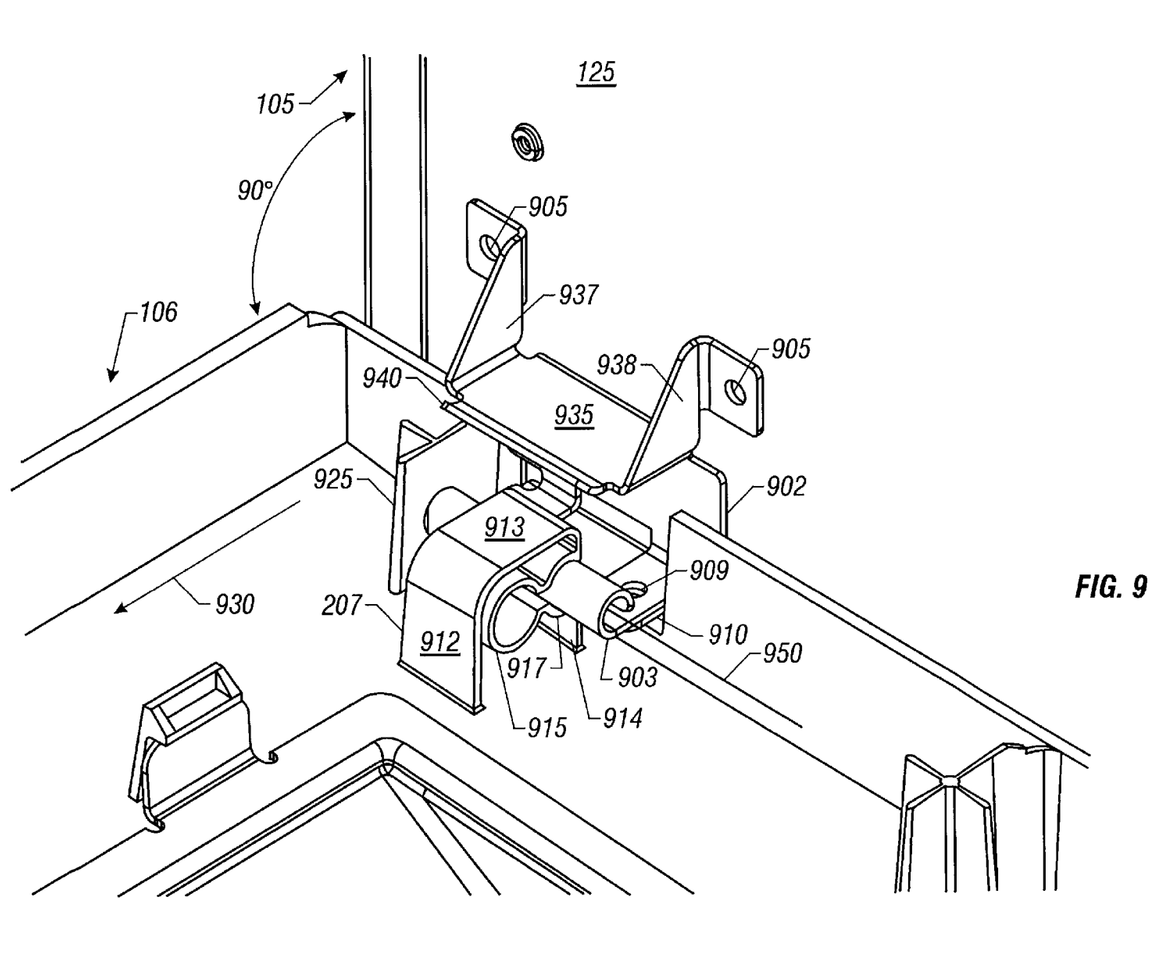
FIG. 9 is a perspective view of one embodiment of a door in an approximately 90 degree open position with respect to the computer system housing frame.

FIG. 9 shows a perspective view of one embodiment of a door in an approximately 90 degree open position with respect to the computer system housing frame. In FIG. 9, the door portion 207 of the hinge is engaging a pivot hub 903 of the frame portion of the hinge to removably and pivotally attach door 106 to the housing frame 105. Pivot hub 903 is part of a hinge bracket 902 which is a frame structure attached to the frame wall 125 via rivets 905 and rivets 909. Rivets 909 (only one rivet is shown in FIG. 9) attach horizontal (relative to the view shown in FIG. 9) members of the hinge bracket 902 to a "bend out" portion 910 of frame wall 125 that is formed from a portion of frame wall 125 that is bent at approximately 90 degrees.

The door portion 207 of the hinge is a flexible snap hinge portion having two partial ring members 915 and 917. When door 106 is removably and pivotally attached to frame structure 105, ring member 917 is engaging pivot hub 903. To close door 106 or move the door to a closed position, the inner portion of ring member 917 pivots around the outer portion of the pivot hub 903. Ring member 915 provides flexible relief for ring member 917 that allows ring member 917 to expand to engage and disengage pivot hub 903 from ring member 917. The door portion 207 of the hinge also includes three side walls 912, 913, and 914. Side wall 914 has an opening (item 1005 of FIG. 10) for the removal of the pivot hub 903 from ring member 917. Door 106 also includes a side wall 925 that prevents the door from being moved to the right, relative to a view facing the front of the computer system housing, by abutting against one end of pivot hub 903. A similar side wall is located on the opposite side of the door portion of the other hinge to prevent the door 106 from being moved to the left, relative to a view facing the front of the computer system housing. Thus, the side walls prevent the lateral movement of the door with respect to the frame when the door is removably and pivotally attached to the housing frame 105. In one embodiment, the side walls are integrally formed with the outer portion of door 106 from which they are connected. However, in other embodiments, the side walls are formed separately from the door and attached to the door.

To remove or unattach door 106 from the computer system housing 103, the door is placed in an open position within an angular range with respect to the frame wall 125 which, in the embodiment shown, includes the 90 degree open position shown in FIG. 9. In one embodiment, the angular range extends from approximately 45° to approximately 100° with respect to the frame wall 125. A force applied on the door 106 in the direction of arrow 930 moves the door away from the frame 105 in the corresponding direction. This removal force expands the opening 1005 of side wall 914 (and ring member 917) allowing for the disengagement of ring member 917 from pivot hub 903 via the opening 1005 in side wall 914.

To attach door 106 to the computer system housing, the door is positioned at an angle within an angular range with respect to frame wall 125 which, in the embodiment shown, includes the 90 degree angle shown in FIG. 9 with the opening 1005 in frame wall 914 abutted against pivot hub 903. In one embodiment, the angular range extends from approximately 45° to approximately 100° with respect to the frame wall 125. A force in the opposite direction of arrow 930 is then applied to door 106 which pushes the opening 1005 in the side wall 914 further against pivot hub 903 thereby forcing the sides of the opening outward to expand the opening 1005 to allow pivot hub 903 to move into ring member 917. Once pivot hub 903 has cleared the opening 1005 in the side wall 914, the sides of the opening 1005 move back towards each other or "snap back" to where ring member 917 securely engages pivot hub 903.

Computer system housing frame 105 includes another hinge bracket (not shown) at a location corresponding to the location of the other door portion of the other hinge.

Figure 10:
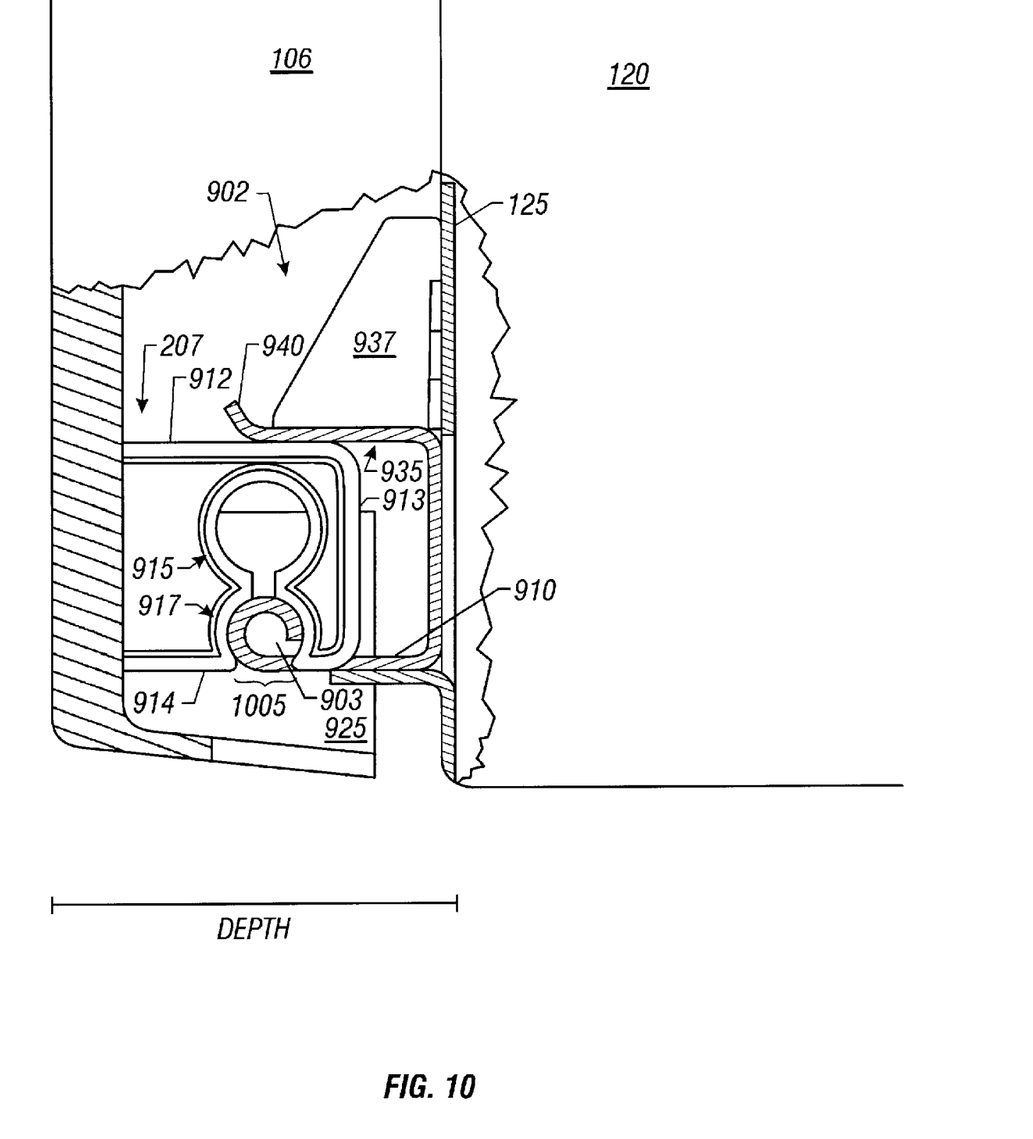
FIG. 10 is a partial cutaway side view of one embodiment of a door in closed position with respect to a computer system housing frame.

FIG. 10 shows a partial cutaway side view of one embodiment of a door in closed position with respect to a computer system housing frame. Hinge bracket 902 includes an entrapment ledge 935 that extends outward in an approximately perpendicular direction from frame wall 125. When door 106 is in the closed position with respect to the housing frame 105, entrapment ledge 935 retains side wall 912 to prevent the movement upward of the door 106, relative to the view shown in FIG. 10, with respect to the housing frame 105. In the embodiment of FIG. 10, without the entrapment ledge 935, an upward force, relative to the view shown in FIG. 10, on door 106 would disengage ring member 917 from pivot hub 903 via opening 1005. Hinge bracket 902 also includes angle supports 937 and 938 which support entrapment ledge 935 in resisting against an upward movement, relative to the view shown in FIG. 10, of the door 106 with respect to the housing frame when the door 106 is in the closed position.

Entrapment ledge 935 includes a curled edge lip 940 that allows for the door portion 207 of the hinge to be rotated clock wise, relative to the view shown in FIG. 10 from a position where ledge 935 does not retain wall 912 to the position of the hinge shown in FIG. 10. Door 106 may be unattached or removed from the housing frame 105 by positioning the door at an angle within an angular range with respect to the frame wall 125 where the entrapment ledge 935, including lip 940, does not retain the door portion 207 of the hinge. In one embodiment, this angular range extends from approximately 45° to approximately 100° with respect to the frame wall 125. Also, door 106 may be attached to the housing frame 105 by placing the door at an angle within an angular range with respect to the frame wall 125 where the entrapment ledge 935, including lip 940, does not interfere with the insertion of the pivot hub 903 into ring member 917. In one embodiment, this angular range extends from approximately 45° to approximately 100° with respect to the frame wall 125.

One advantage of the hinge structure of the computer system housing is that a force for lifting the entire computer system housing may be applied to the removably attached door 106. This advantageously allows the door to have a greater depth dimension (see FIG. 10) as the door can support the weight of the computer system. Allowing the door to have a greater depth dimension enables a portion of a peripheral device carrier located within a chassis carrier bay (such as item 110) of the housing frame 105 to extend out from the bay 110 when the peripheral device is operably coupled to the computer system processor. This extension of the chassis carrier provides a hold for a user in removing the carrier from the bay, thus reducing the complexity of the chassis carrier removal mechanism or device.

Another advantage of the hinge structure of the present invention is that the door can be removably attached to the housing frame without having to move the door in a lateral direction with respect to the front of the computer system housing. Referring back to FIG. 9, to removably attach the door to the housing frame, the door 106 is moved towards the frame wall 125 when the door is positioned with respect to the frame wall 125 within an angular range (approximately 45°–approximately 100° in one embodiment) of orientations which, in the embodiment shown, includes the approximately 90 degree orientation shown in FIG. 9. No left or right movement, with respect to a view from the front of the computer system housing, is required for the door 106 to be removably attached. Consequently, the present invention provides for a removably attachable door to be attached to a frame structure without requiring the door to be moved in a direction that is parallel to the axis of the pivot of the hinge (See axis 950 in FIG. 9). This enables the door to be attached to the housing frame when the computer system housing resides in locations having a minimal amount of lateral room such as when the computer system housing is mounted in a tightly packed electronics rack.

Figure 11:
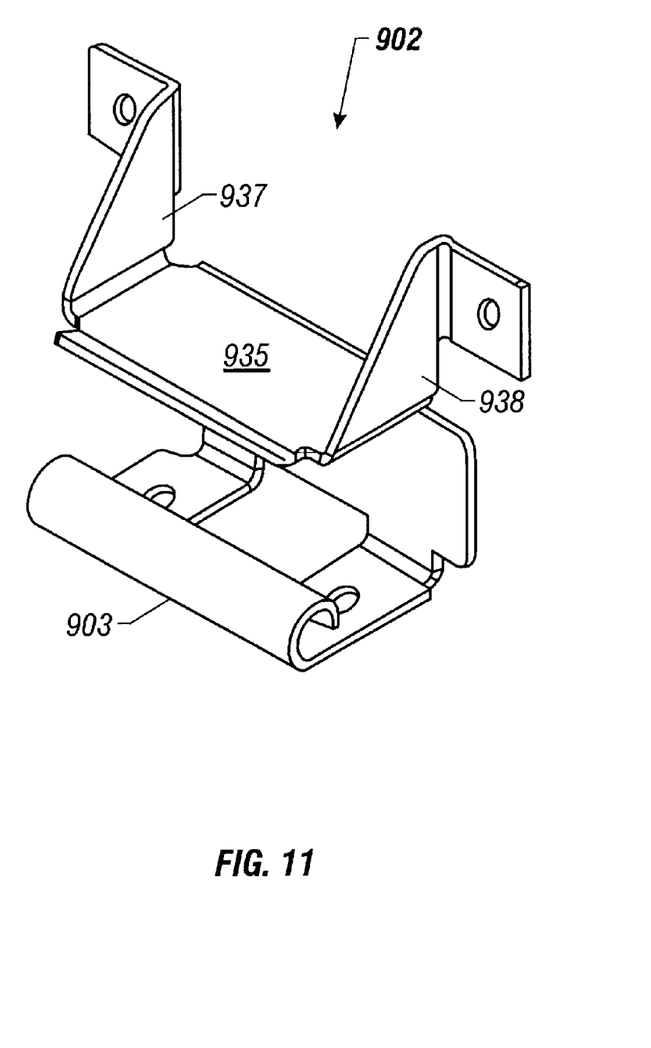
FIG. 11 is a perspective view of one embodiment of a housing frame hinge bracket according to the present invention.

FIG. 11 shows a perspective view of one embodiment of a housing frame hinge bracket according to the present invention. In FIG. 11, hinge bracket 902 is integrally formed from a sheet of a metal material such as a material having an American Society of Testing on Materials (ASTM) number of A591B. In one embodiment, the sheet of metal is cut or stamped as per a specific pattern and then bent or folded into the resultant shape shown in FIG. 11. In one embodiment, the sheet has a thickness of 0.036".

In other embodiments, the pivot hub, entrapment ledge and/or angled supports may be formed separately. In one embodiment, the pivot hub is a cylindrical bar or pin. In other embodiments, the pivot hub, entrapment ledge and/or angled supports may be formed by bending portions of the frame wall. Also in other embodiments, the hinge bracket may be formed of other material such as plastics.

While particular embodiments of the present invention have been shown and described, it will be obvious to those skilled in the art that changes and modifications may be made without departing from this invention and its broader aspects and, therefore, the appended claims are to encompass within their scope all such changes and modifications as are within the true spirit and scope of this invention.

What is claimed is:

1. A keylock assembly attachable to a door for locking a door to a housing frame comprising:
    a keylock device including:
        a keylock; and
        a latch member movable by the keylock to a locked position where a portion of the housing frame retains the latch member to lock the door to the housing frame;
    a securing device attached to the keylock device, wherein when the door is in a closed position, the securing device engages a corresponding structure of the housing frame to secure the door to the housing frame independent of the keylock being in a locking position;
    wherein the securing device is a ball stud having a threaded portion screwed into the keylock.

2. The keylock assembly of claim 1 wherein the corresponding structure is a clip having two resiliently movable prongs.

3. The keylock assembly of claim 1 wherein the securing device secures the latch member to the keylock when the securing device is screwed into the keylock.

4. The keylock assembly of claim 1 wherein the keylock defines a threaded hole, the threaded portion of the securing device being screwed into the threaded hole to attach the securing device to the keylock.

5. The keylock assembly of claim 1 wherein the keylock is a cylindrical keylock with a first end and a second end, the first end defining a keyhole, the securing device being attached to the keylock at the second end.

6. The keylock assembly of claim 1 wherein when the keylock moves the latch member to lock the door, the keylock simultaneously moves the securing device, and wherein the securing device continuously engages the corresponding structure of the housing frame to secure the door to the housing frame when the keylock simultaneously moves the securing device when the keylock moves the latch member to lock the door.

7. The keylock assembly of claim 1 wherein the keylock includes:

an inner barrel; and an outer structure, the inner barrel rotatable with respect to the outer structure;

wherein the securing device is attached to the inner barrel.

8. The keylock assembly of claim 7 wherein moving the keylock from an unlocking position to a locking position includes rotating the inner barrel with respect to the outer structure via a force applied to a compatible key inserted into a keyhole of the keylock.

9. A keylock assembly attachable to a door for locking a door to a housing frame comprising:

a keylock device including:
  a keylock; and
  a latch member movable by the keylock to a locked position where a portion of the housing frame retains the latch member to lock the door to the housing frame;

a securing device attached to the keylock device, wherein when the door is in a closed position, the securing device engages a corresponding structure of the housing frame to secure the door to the housing frame independent of the keylock being in a locking position;

wherein the keylock defines a threaded hole, a threaded portion of the securing device being screwed into the threaded hole to attach the securing device to the keylock;

wherein the latch member defines a latch hole, and wherein when the securing device is screwed into the threaded hole, a portion of the securing device extends through the latch hole to attach the latch member to the keylock.

10. The keylock assembly of claim 9 wherein:

the securing device is a ball stud.

11. The keylock assembly of claim 9 wherein the securing device includes a detent, and wherein when the securing device is engaging the corresponding structure, a portion of the corresponding structure resides in the detent.

12. A housing comprising:

a frame structure;

a door; and a keylock assembly attached to the door, the keylock assembly including:
  a keylock device including:
    a keylock; and
    a latch member movable by the keylock to a locked position where the frame structure retains the latch member to lock the door to the frame structure;

a securing device attached to the keylock device, wherein when the door is in a closed position, the securing device engages a corresponding structure of the frame structure to secure the door to the frame structure independent of the keylock being in a locking position;

wherein the securing device is a ball stud having a threaded portion screwed into the keylock.

13. The housing of claim 12 wherein the corresponding structure is a clip having two resiliently movable prongs.

14. The housing of claim 12 wherein the securing device secures the latch member to the keylock when the securing device is screwed into the keylock.

15. The housing of claim 12 wherein the corresponding structure includes a resiliently movable prong.

16. The housing of claim 12 wherein when the latch member is in a locked position, the keylock is in a locking position.

17. A computer system comprising:

a processor;

a peripheral device operably coupled to the processor, and a computer system housing including:
  a frame structure;
  a door; and
  a keylock assembly attached to the door, the keylock assembly including;
    a keylock device including:
      a keylock; and
      a latch member movable by the keylock to a locked position where a portion of the frame structure retains the latch member to lock the door to the frame structure;
    a securing device, wherein when the door is in a closed position, the securing device engages a corresponding structure of the frame structure to secure the door to the frame structure independent of the keylock being in a locking position;

wherein the computer system housing houses the peripheral device;

wherein the securing device is a threaded ball stud screwed into the keylock.

18. The computer system of claim 17 wherein the peripheral device is a hard disk drive.

19. The computer system of claim 17 wherein the frame structure defines an opening, wherein the peripheral device is removable from the computer system housing via the opening when the door is in an open position with respect to the frame structure, and wherein when the door is locked to the frame structure, the removability of the peripheral device via the opening is inhibited.

20. The computer system of claim 17 wherein the door incorporates bezel-like features to retain the peripheral device within the computer system housing.

21. The computer system of claim 17 wherein the corresponding structure is a clip having two resiliently movable prongs.

22. The computer system of claim 17 wherein the securing device includes a threaded portion, the threaded portion being screwed into the keylock.

23. The computer system of claim 22 wherein the securing device secures the latch member to the keylock when the securing device is screwed into the keylock.

24. The computer system of claim 17 wherein when the keylock moves the latch member to lock the door, the keylock simultaneously moves the securing device, and wherein the securing device continuously engages the corresponding structure of the housing frame to secure the door to the housing frame when the keylock simultaneously moves the securing device when the keylock moves the latch member to lock the door.

25. The computer system of claim 17 wherein the corresponding structure includes a resiliently movable prong.

26. The computer system of claim 17 wherein moving the keylock from a locking position to an unlocking position moves the latch member from a locked position to an unlocked position.

27. A housing comprising:
- a frame structure;
- a door; and
- a keylock assembly attached to the door, the keylock assembly including:
    - a keylock device including:
        - a keylock; and
        - a latch member movable by the keylock to a locked position where the frame structure retains the latch member to lock the door to the frame structure:
    - a securing device attached to the keylock device, wherein when the door is in a closed position, the securing device engages a corresponding structure of the frame structure to secure the door to the frame structure independent of the keylock being in a locking position;
- wherein the keylock defines a threaded hole, a threaded portion of the securing device being screwed into the threaded hole to attach the securing device to the keylock;
- wherein the latch member defines a latch hole, and wherein when the securing device is screwed into the threaded hole, a portion of the securing device extends through the latch hole to attach the latch member to the keylock.

28. The housing of claim 27 wherein:
the securing device is a ball stud.

29. A computer system comprising:
- a processor;
- a peripheral device operably coupled to the processor; and
- a computer system housing including:
    - a frame structure;
    - a door; and
    - a keylock assembly attached to the door, the keylock assembly including:
        - a keylock device including;
            - a keylock; and
            - a latch member movable by the keylock to a locked position where a portion of the frame structure retains the latch member to lock the door to the frame structure;
        - a securing device, wherein when the door is in a closed position, the securing device engages a corresponding structure of the frame structure to secure the door to the frame structure independent of the keylock being in a locking position;
- wherein the computer system housing houses the peripheral device;
- wherein the keylock defines a threaded hole, a threaded portion of the securing device being screwed into the threaded hole to attach the securing device to the keylock;
- wherein the latch member defines a latch hole, and wherein when the securing device is screwed into the threaded hole, a portion of the securing device extends through the latch hole to attach the latch member to the keylock.

30. The computer system of claim 29 wherein:
the securing device is a ball stud.

* * * * *